United States Patent [19]

Fujiwara et al.

[11] Patent Number: 4,843,604
[45] Date of Patent: Jun. 27, 1989

[54] BEAM CONTROLLER FOR MAGNETO-OPTICAL DISC MEMORY SYSTEM

[75] Inventors: Tetsuo Fujiwara; Hiroshi Fuji; Takashi Iwaki, all of Tenri; Toshihisa Deguchi; Shozou Kobayashi, both of Nara, all of Japan

[73] Assignee: Sharp Kabushiki Kaisha, Osaka, Japan

[21] Appl. No.: 919,672

[22] Filed: Oct. 16, 1986

[30] Foreign Application Priority Data

Oct. 16, 1985 [JP] Japan .................................. 60-230544
Nov. 30, 1985 [JP] Japan .................................. 60-270476

[51] Int. Cl.$^4$ .......................................... G11B 11/12
[52] U.S. Cl. ...................... 369/116; 369/106; 369/13; 250/205
[58] Field of Search ............... 369/13, 116, 121, 122, 369/100, 106; 307/353; 328/151; 372/29, 31; 250/205

[56] References Cited

U.S. PATENT DOCUMENTS

| 4,404,479 | 9/1983 | Toyomaki | 328/151 |
| 4,509,156 | 4/1985 | Ohara et al. | 369/116 |
| 4,651,034 | 3/1987 | Sato | 328/151 |

OTHER PUBLICATIONS

Hatsios, IBM Tech. Dis. Bulletin, p. 761, vol. 13, No. 3, Aug. 1970.

Primary Examiner—Alan Faber
Assistant Examiner—Hoa T. Nguyen
Attorney, Agent, or Firm—Birch, Stewart, Kolasch & Birch

[57] ABSTRACT

A beam controller for controlling a semiconductor laser included in an optical recording-play-back apparatus. The beam controller is comprised of first and second current sources for driving the semiconductor laser at a low level during a play-back mode and at a high level during an erasing mode. The first and second current sources are respectively automatically controlled by a first and second auto-power control circuit to provide stable power outputs.

4 Claims, 5 Drawing Sheets

BEAM CONTROLLER FOR MAGNETO-OPTICAL DISC MEMORY SYSTEM

BACKGROUND OF THE INVENTION

1. Field of the Invention

The present invention relates to a beam control device for controlling laser beam of a semiconductor laser included in an optical memory system and in which data can be recorded, played back and/or erased by directing the laser beam onto a magneto-optical disc.

2. Description of the Prior Art

As is well known to those skilled in the art, a magneto-optical disc comprises a structure wherein an amorphous film of rare metal-ferroalloy is deposited on a substrate, such as a glass substrate, by sputtering and which is then covered with a magnetic film having an axis of easy magnetization perpendicular to the surface of the magnetic film.

An optical memory system has a recording head for recording data onto the disc, playing back or erasing the recorded data previously recorded. A semiconductor laser is provided for directing a laser beam onto the disc.

In such an optical memory system, the recording of data is effected according to the following method: a laser beam, focused to a spot of a diameter of about 1 $\mu$m, is directed to the magnetic film of the disc to raise the temperature of the portion to which the laser beam is applied in order to reduce the coercive force thereat. At the same time, the direction of magnetization is inverted by applying an auxilliary magnetic field externally of the portion whose temperature has been raised. The erasing method is substantially the same as the recording method just mentioned.

The play-back method for data recorded is as follows: linearly polarized light of the laser beam having an intensity of light weaker than that of the recording beam is applied to the magnetic film of the disc at the location where the data has been recorded. The light reflected therefrom has a certain inclination of polarization due to the magneto-optical effect of the magnetic film (Kerr effect). The inclination of polarization is next converted to an intensity modulated beam of light by an analyzer from which signals are generated and fed as an output from a photo-detector.

As is apparent from the mentioned above, the semiconductor laser is driven at both a high and low levels for recording and playing, respectively.

The semiconductor laser has a temperature dependence in that the intensity of the laser beam varies according to the ambient temperature due to the variation of the threshold current of the semiconductor. If the intensity of laser beam varies during the high level recording mode erroneous information will written into the disc. This lowers the integrity of the optical memory system. Similarly this also applies to the play-back mode. Namely, that when the intensity of laser beam is varied during play-back, the signal to noise (S/N) ratio of play-back signals is lowered to provide wrong output information.

In order to overcome the problems mentioned above, a laser beam controller has been proposed for an optical memory system as shown in FIG. 5.

According to the prior art laser beam controller of FIG. 5, there are provided first and second current sources (b) and (c) for supplying two respectively different driving currents to a semiconductor laser (a). The first current source (b) is utilized for supplying a low power driving current $I_1$ during play-back of recorded data while during the recording of data, the second current source (c) supplies a high power driving current $I_2$ to the semiconductor laser in addition to the first current source (b) in order to obtain a laser beam of a high intensity.

When the laser (a) is driven only by the first current source (b), the intensity of laser beam emitted therefrom is detected by a photodetector (d). The output signal thereof is fed as an input, via a pre-amplifier (e), to a sample and hold circuit (f). The sample and hold circuit (f) is controlled by a signal $S_1$ in such a manner that, when the signal $S_1$ has a high level, entered data is held therein but is fed therethrough when it receives a low level of $S_1$. The data signal outputted from the sample and hold circuit (f) is with a reference voltage provided by a standard voltage source (g) in a differential amplifier (h).

The output of differential amplifier (h) is fed as on input to a low-pass filter (i). Low frequency components of the input signal are passed therethrough and are coupled to a power amplifier (j). The power amplifier (j) in turn controls the low current $I_1$ of the low power current source (b).

Accordingly if the sample and hold signal $S_1$ is at a low level and the beam intensity of the semiconductor laser (a) is kept constant irrespective to the temperature dependence thereof, this control system is referred to APC (Auto-Power Control).

During a high power driving mode (recording mode), the sample and hold signal $S_1$ is switched to a high level and the sample and hold circuit (f) holds the data signal and, therefore, the APC is frozen or locked.

Further, when the high power driving or recording mode is chosen, a data-record signal $S_D$ of a high level is applied to an AND gate (k) together with the high level sample and hold signal $S_1$. The output of the AND gate (k) controls a switching circuit (1). The switching circuit (1) is turned on when the output of AND gate (k) goes to a high level and, at that time, the current $I_2$ supplied by the high power current source (c) is added to the current $I_1$ in order to drive the semiconductor laser (a) at the high power level. The reason for making APC freeze is to avoid a possible drop of the beam intensity during the recording and/or erasing mode.

However, APC operates to some extent even in the high power driving mode. This is based on the premise that only the threshold value varies with the ambient temperature, when considering the driving current as a function of the beam intensity curvature characteristic of the semiconductor laser, and that the gradient of said curvature above the threshold value does not vary with the ambient temperature. Namely, if the low power driving current $I_1$ is controlled so as to have a higher value than the threshold value, APC can be realized even in the high power driving mode by superimposing a constant current and the low power driving current. But these premises are not correct since the gradient of the curve above the threshold does vary with the ambient temperature and use-time.

The sample and hold circuit (f) employed in the APC circuit as shown in FIG. 6 is comprised of a low-pass filter (m) into which the output from a differential pre-amplifier (h) is coupled, a memory means (n) which can store the output $V_0$ of the low-pass filter (m) and a switching means (o) for switching either the low pass filter (m) or the memory circuit (n) output to a low power driving current source (b). When the play-back mode is desired, the switching means (o) is switched so as to directly connect the low-pass filter (m) to the low power driving current source (b). The differential amplifier (h) outputs a signal $V_1$ proportional to the difference between the output signal Va from the photodetector (d) and a predetermined reference voltage Vb. Therefore, APC is obtained as mentioned above.

When the recording mode (high power driving mode) is selected, the switching circuit (o) is switched by the data recording signal $S_D$ so as to connect the output of the memory circuit (n) to the low power driving current source (b). Accordingly, the sample hold circuit (f) outputs a voltage signal $V_m$ which was stored in the memory circuit (n) due to the sample and hold signal $S_1$. As can clearly be seen, the sample and hold circuit (f) has a first mode in which the output $V_0$ of the low pass filter (m) is fed out and a second mode during which the output $V_m$ stored in the memory circuit (n) is fed out.

However, this known type of sample and hold circuit (f) has an essential disadvantage in that it is difficult to obtain a quick response when switching from the recording mode to the play-back mode or vice versa since the low pass filter (m) has a relatively slow transition response time.

The response of the low pass filter (m) is shown in FIG. 7. When the operational mode is switched from the recording mode to the play-back mode, the rise of the output voltage Vo of the low pass filter (m) is delayed. Due to this delay in the transition response time, the low power driving current $I_1$ from the first current source (b) is also delayed and therefore, it takes time until the low power driving current $I_1$ becomes stabilized.

SUMMARY OF THE INVENTION

One of the objects of the present invention is to provide a beam controller for an optical memory system in which automatic po were control or APC can be achived not only in the low power driving mode (play-back mode) but also with precision in the high power driving mode (recording mode).

Another object of the present invention is to provide a beam controller having a sample and hold circuit which exhibits a fast response time when switching from the recording mode to the play-back mode or vice versa.

To this end, and according to a first embodiment of the present invention, there is included provided a beam controller for controlling a semiconductor laser provided in an optical recording and play-back apparatus which comprises:

a first current source for driving said semiconductor laser at a low level necessary for playing back data stored in an optical memory means, a second current source for driving said semiconductor laser at a high level necessary for recording and/or erasing data into the optical memory means, a first sample and hold circuit for storing data corresponding to a beam intensity from said semiconductor laser being detected during play back of the stored data, first control means for controlling the output of the first current source according to the output from the first sample and hold circuit when recording and/or erasing data in the optical memory means, a second sample and hold circuit for storing data corresponding to a beam intensity from said semiconductor laser being detected when recording data, second control means for controlling the output current of the second current source according to the output from the second sample and hold circuit when recording data in the optical memory means.

Further, and according to a second embodiment of the present invention, there is provided a beam controller for controlling a semiconductor laser included in an optical recording and play-back apparatus which comprises:

a first current source for driving said semiconductor laser at a low level necessary for playing back data memorized in an optical memory means, a second current source for driving said semiconductor laser at a high level necessary for recording data in the optical memory means and/or erasing stored data, a sample and hold circuit being comprised of a switching means having first and second input terminals and one output terminal, a low-pass filter means connected to the output terminal of the switching means and memory means for storing an output signal from the low-pass filter means, and wherein said first input terminal of the switching means is connected so as to input the data corresponding to the beam intensity from said semiconductor laser, second input terminal of the switching means is connected to the output of the memory means, and wherein said switching means is controlled so as to connect the first input terminal to the low-pass filter when the play-back mode is selected and, when the recording or erasing mode is selected, to connect the second input terminal from the memory means to the low-pass filter, and control means for controlling said first current source according to the output signal from the sample-hold circuit.

BRIEF DESCRIPTION OF THE DRAWINGS

These and other objects and features of the present invention will become more apparent from the description of the preferred embodiments accompanying the drawings attached herein; in which.

DETAILED DESCRIPTION OF THE PREFERRED EMBODIMENT

First Preferred Embodiment

Figure 1:
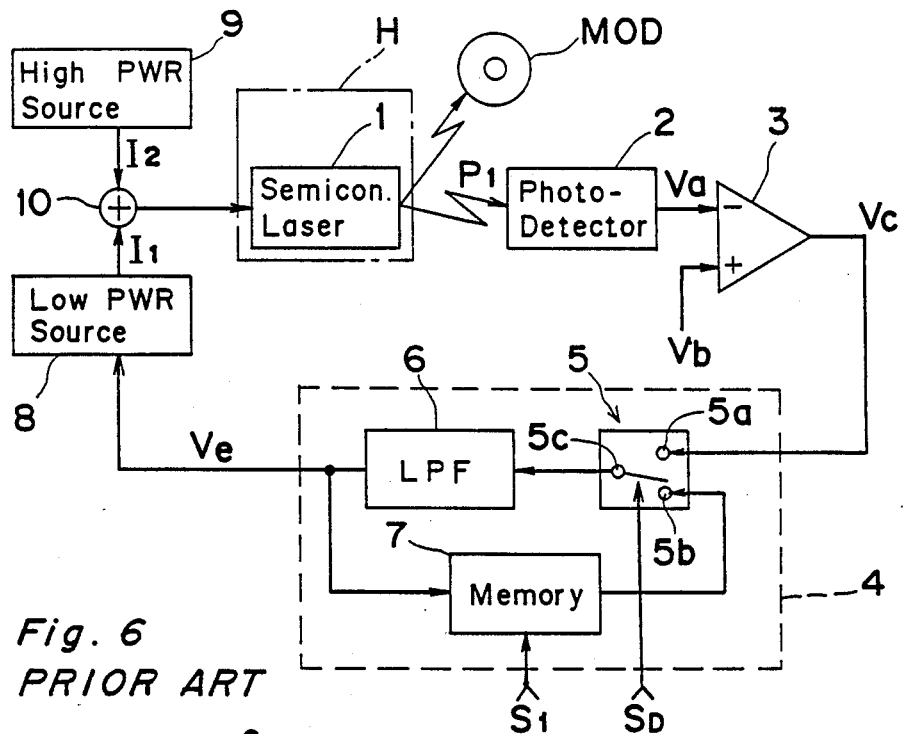
FIG. 1 is a block diagram showing a beam controller according to a first preferred embodiment of the present invention.
Figure 6:
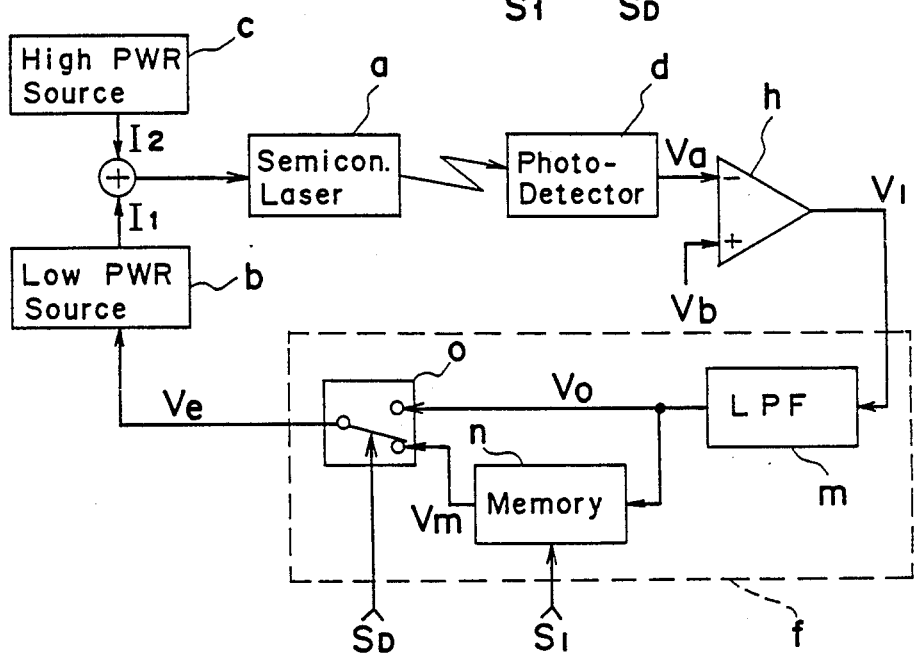
FIG. 6 is a block diagram showing another conventional beam controller.

FIG. 1 shows a block diagram of a beam controller according to a first embodiment of the present invention.

As is well known to those skilled in the art, a semiconductor laser device 1 is included as the light source in a recording head H for recording data to a magneto-optical disc MOD and/or erasing or playing back data stored therein.

The beam controller for controlling the intensity of laser beam emitted from the semiconductor laser device 1 is comprised of: a photodetector 2 which transforms the laser beam intensity $P_1$ into a voltage signal Va proportional thereto to $P_1$; a differential amplifier 3 which compares the voltage signal Va with a predetermined reference voltage Vb and outputs a difference signal Vc proportional to a difference between two voltage Va and Vb (Vc$\alpha$Vb-Va); a sample and hold circuit 4 for generating a control signal Ve in order to control a low power driving current source 8 and an adder 10 for adding a high power driving current $I_2$ supplied by a high power driving current source 9 to a low level driving current $I_1$ supplied by the low level driving current source 8.

The sample and hold circuit 4 is comprised of a switching means 5, a low-pass filter 6 and a memory circuit 7. The switching means 5 has a first input terminal 5a connected to the output of the differential amplifier 3, a second input terminal 5b connected to the output of the memory circuit 7 and one output 5c connected to the input of the low-pass filter 6. The output of the low-pass filter 6 is connected to the first driving current source 8 and the input of the memory circuit 7.

The memory circuit 7 is operated to store the output signal of the low-pass filter 6 when a sample and hold signal $S_1$ is applied thereto by a control circuit of the optical memory system (not shown). Also, the switching means 5 is switched from the first input terminal 5a to the second input terminal 5b when a recording signal $S_D$ is applied thereto by a control circuit which is operative during the recording mode and erasing mode of the system.

Accordingly, the sample and hold circuit 4 operates to directly connect the output of the differential amplifier 3 to the low-pass filter 6 during the play-back mode and to connect the output of the memory circuit 7 to the low-pass filter 6 during the recording or erasing mode in order to apply the signal stored in the memory circuit 7 to the first driving current source 8.

The second driving current source 9 is turned on by the recording signal $S_D$ during the recording mode and erasing mode and the adder 10 supplies the high level driving current ($I_1+I_2$) to the semiconductor laser 1 during the recording mode or the erasing mode.

Figure 2:
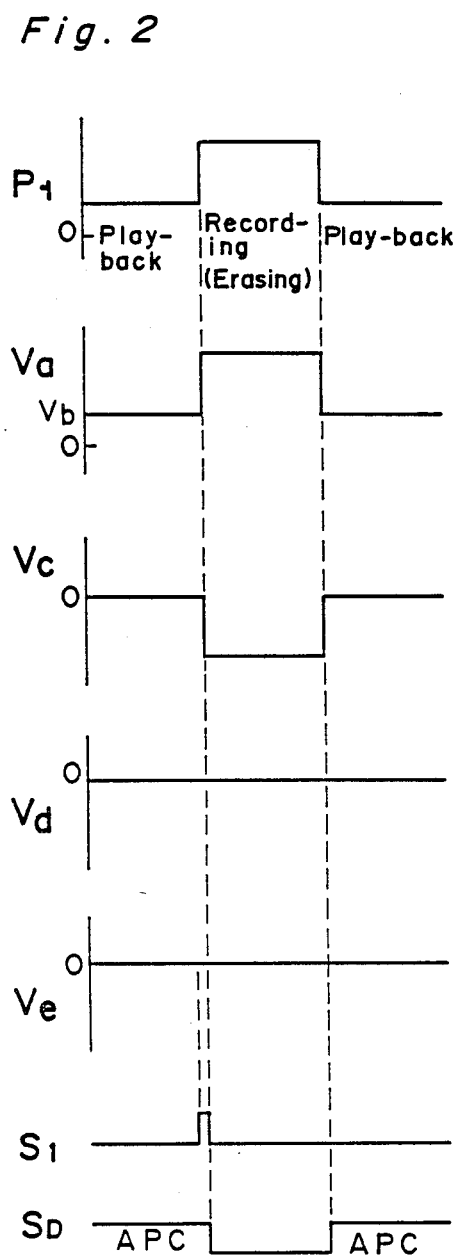
FIG. 2 is a set of time related waveforms of the beam controller shown in FIG. 1.
Figure 7:
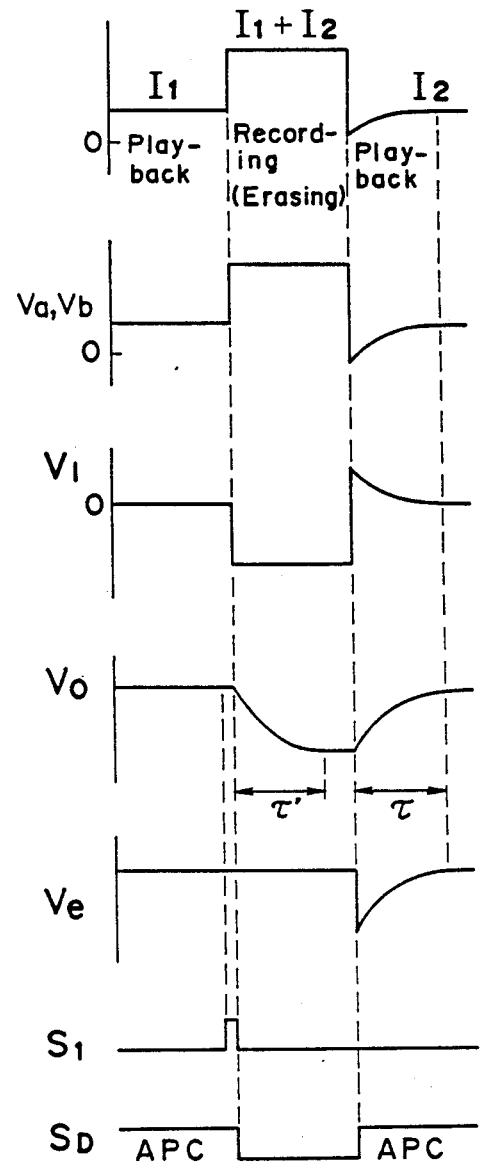
FIG. 7 is a set of time related waveforms of the conventional beam controller shown in FIG. 6.

FIG. 2 shows a timing chart of the beam controller.

As shown in FIG. 2, the beam intensity $P_1$ is stablized at a predetermined low level during the play back mode by APC constituted from the photo detector 2, the differential amplifier 3 and the sample and hold circuit 4 as mentioned above. The beam intensity $P_1$ is transformed into voltage signal Va and the differential amplifier 3 outputs the voltage signal Vc proportional to the difference between the signal Va and the reference signal Vb.

The sample and hold circuit 4 according to the present invention does not exhibit any transition delay as explained herebelow.

Initially, during the play back mode, APC is provided by the sample hold hold circuit 4 since the differential amplifier 3 is directly connected to the low-pass filter 6 during this mode.

Next, just before the recording (erasing) mode starts, the memory circuit 7 stores the filtered voltage signal Ve obtained during the play-back mode by applying the sample and hold signal $S_1$ circuit 7 as shown in FIG. 2. And, the switching means 5 is then switched from the first input terminal 5a to the second input terminal 5b when the recording signal $S_D$ (FIG. 2) goes from a high level to a low level. Therefore, when the recording mode is selected, voltage signal data stored in the memory circuit 7 is fed as an input into the low-pass filter 6 through the second input terminal 5b. Accordingly, the output signal Ve of the low-pass filter 6 is kept constant because of the stored value in memory. Due to this, the output signal Ve does not exhibit any transition response.

As the result of this, the low power driving current $I_1$ of the first current source 8 is kept constant without the effect of any transitional response of the low pass filter 6.

Accordingly, a stable high level driving current ($I_1+I_2$) can be obtained as soon as the mode is switched from the play-back mode to the recording (or erasing) mode. Even if the mode is switched from the recording (or erasing) mode to the play-back mode, the output signal Ve of the low-pass filter 6 remains unchanged since the voltage signal Vc of the differential amplifier 3 is raised to a level substantially equal to that in the preceding play-back mode as soon as the mode is switched from the recording mode to the play-back mode.

Second Preferred Embodiment

In this embodiment, another APC is introduced in for use in the high power driving mode namely the recording or erasing mode.

Figure 3:
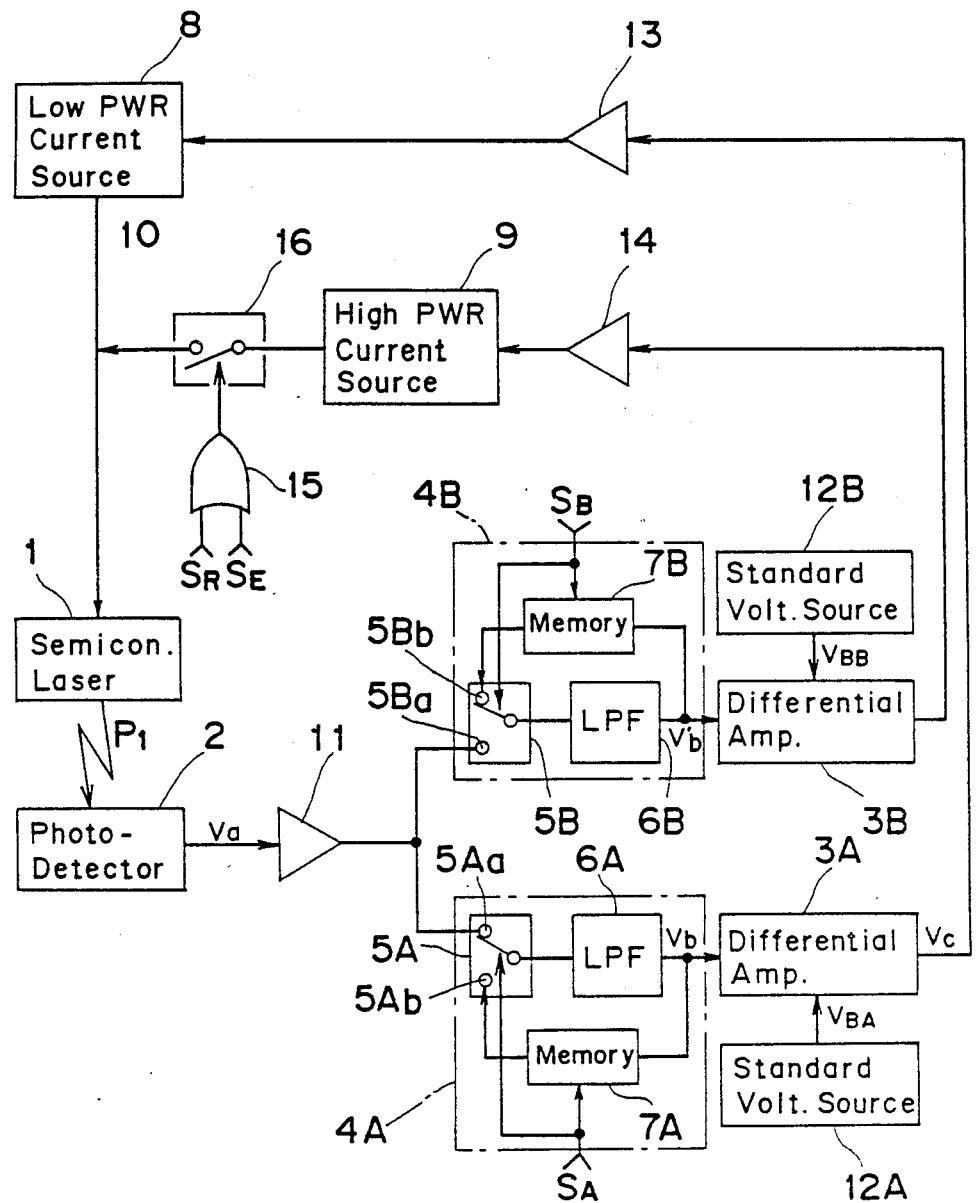
FIG. 3 is a block diagram showing a beam controller according to the second preferred embodiment of the present invention.

Referring now to FIG. 3, the output signal Va of the photodetector 2 which detects the beam intensity $P_1$ of the semiconductor laser 1 is fed via a pre-amplifier 11 into a first sample and hold circuit 4A for providing APC during low power driving mode and into a second sample and hold circuit 4B for providing APC during a high power driving mode.

Figure 4:
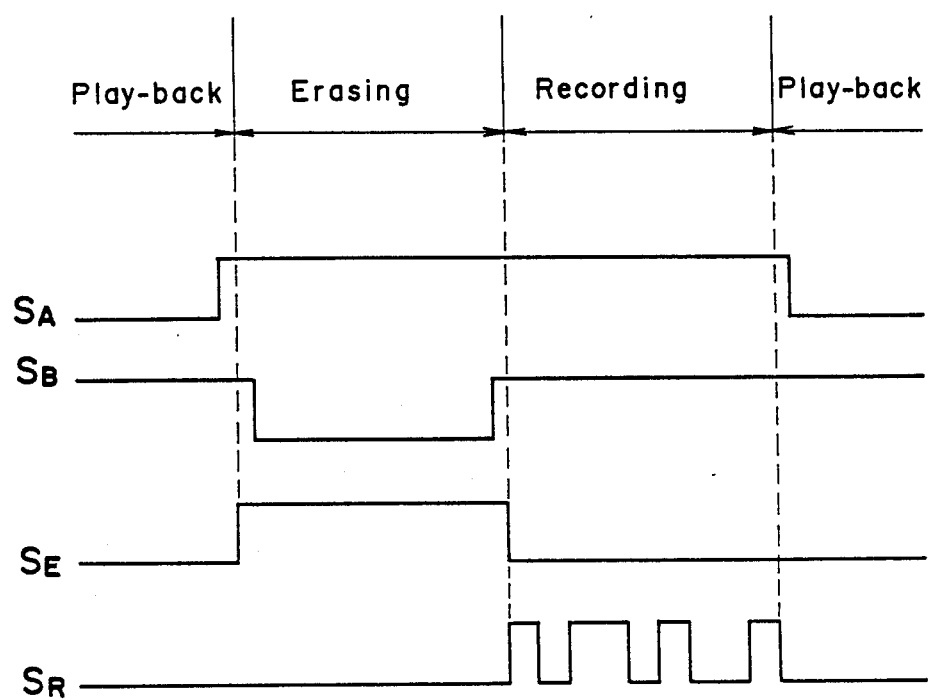
FIG. 4 is a set of time related waveforms of the beam controller shown in FIG. 3.
Figure 5:
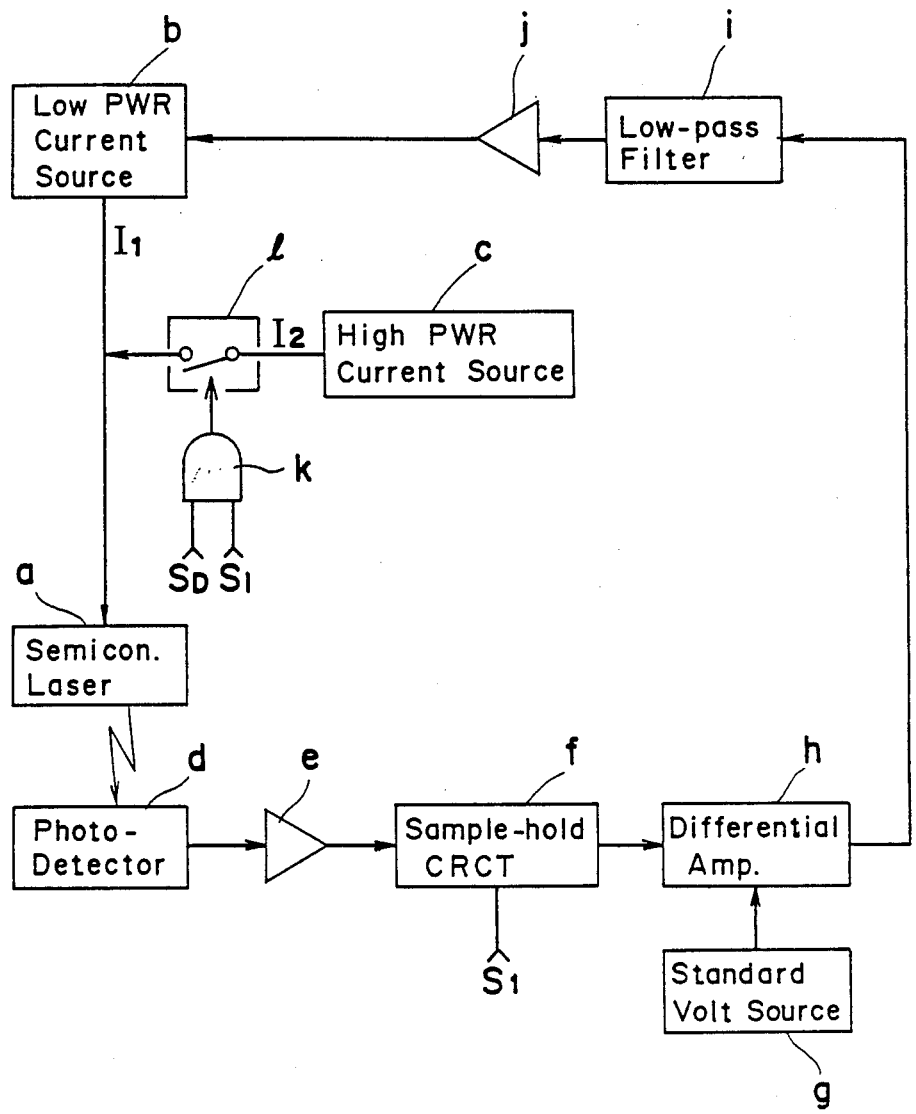
FIG. 5 is a block diagram showing one conventional beam controller.

The first sample and hold circuit 4A is controlled by a first control signal $S_A$. As shown in FIG. 4, the first control signal $S_A$ switches from a "Low" level to a "High" level just before the time when the mode is switched from the play-back mode to the erasing mode, and is kept at the "High" level during both the erasing and recording modes, and is then switched from the "High" level to the "Low" level just after the time when the mode is switched from the recording mode to the next play-back mode.

The memory circuit 7A stores the output of the low-pass filter 6A during the rise time of the first control signal $S_A$ and, at the same time, the switching means 5A is switched from the first input terminal 5Aa to the second input terminal 5Ab. Namely, the first sample and hold circuit 4A freezes or fixes the APC for the low power driving mode.

On the other hand, the second sample and hold circuit 4B is controlled by a second control signal $S_B$. As shown in FIG. 4, the second control signal $S_B$ is switched from a "High" level to a "Low" just after the time when the mode is switched from the play-back mode to the erasing mode, and is switched from the "Low" level to the "High" level just before the time when the mode is switched from the erasing mode to the recording mode.

The memory circuit 7B of the second sample hold circuit 4B is set to hold the data stored during the time the second control signal $S_B$ is at a "High" level. The switching means 5B is also switched from the second input terminal 5Bb to the first input terminal 5Ba at the fall time of the second control signal $S_B$.

In the play-back mode, namely the low power driving mode, APC for the low power driving current source 8 is carried out as follows.

The photo-detector 2 detects the intensity $P_1$ of the laser beam emitted from the semiconductor laser 1 and the output voltage signal Va thereof is fed, via the pre-amplifier 11, into the first sample-hold circuit 4A. The first control signal $S_A$ is kept at a "Low" level during this mode, and therefore, the output signal Va of the photodetector 2 is fed directly to the low pass filter 6A and then, the output signal Vb of the low pass filter 6A is input into the first comparator 3A. The comparator 3A compares the input signal data Vb with a low level reference voltage $V_{BA}$ which is set by a first standard voltage source 12A and then, outputs a voltage signal Vc proportional to the difference between Vb and $V_{BA}$ (VC $V_{BA}$−Vb). This output signal Vc is input into a power amplifier 13 provided for controlling the low power driving current source 8.

Thus, APC for play-back mode is carried out by applying a stabilized low power driving current $I_1$ to the semiconductor laser 1.

During this mode, neither an erasing signal $S_E$ nor a recording signal $S_R$ is applied to an OR gate 15. Accordingly, a switch means 16 controlled by an adder 10, is kept in OFF state.

Alternatively, APC for the high power driving mode is carried out as follows.

Initially, as shown in FIG. 4, the first control signal $S_A$ is at a "Low" level just before the start of the erasing mode to freeze or fix the value of the APC for the play-back mode.

Then, during an erasing period signal $S_E$ is raised to a "High" level to close the switch 16. Therefore, a second driving current $I_2$, supplied by the high power driving current source 9, superimposed on the low driving current $I_1$. Therefore, the semiconductor laser 1 is driven by a high power driving current ($I_1+I_2$) necessary for erasing data. Just after the mode is switched to the erasing mode, the second control signal $S_B$ is dropped to "Low" level as shown in FIG. 4. Due to this, the switching means of the second sample-hold circuit 4B is switched from the second input terminal 5Bb to the first input terminal 5Ba to pass signal outputted from the pre-amplifier 11 therethrough and to input the filtered signal directly to the second differential amplifier 3B.

The second differential amplifier 3B compares the output signal Vb' from the low-pass filter 6B with a second reference voltage $V_{BB}$ of a high level predetermined by a second standard voltage source 12B and outputs a voltage signal Vc' proportional to the difference between two voltages (Vc'$\alpha V_{BB}$−Vc') to a second power amplifier 14 provided for the high power driving current source 9. Thus, APC for the high power driving mode is obtained during "erase".

Just before the mode is switched from the erasing mode to the recording mode, the second control signal $S_B$ is switched to "High" level. Due to this, the memory circuit 7B memorizes the output Vb' of the low-pass filter 6B and is connected to the input of the low-pass filter 6B. Namely, APC for the high driving mode is frozen and the output signal of the second sample and hold circuit 4B is fixed to a value obtained during APC of the erasing mode.

Then, the erasing signal $S_E$ is dropped to "Low" level to start the recording mode. During the recording mode, data is recorded according to the recording signal $S_R$ which acts to close switch 16.

It is to be noted that APC is not provided during the recording mode but it is provided just before the recording mode, in other words during the erasing mode in which the semiconductor laser is driven by a high power driving current. This ensures the stable beam control during the recording mode.

Although the present invention has been fully described by way of example with reference to the accompanying drawings, it is to be noted here that various changes and modifications will be apparent to those skilled in the art are possible without departing from the scope of the present invention, they should be construed as being included therein.

What is claimed is:

1. A beam controller for controlling a semiconductor laser included in an optical recording and play-back apparatus including optical memory means and which comprises:

a first current source for driving said semiconductor laser at a relatively low level for playing back data memorized in said optical memory means;

a second current source for driving said semiconductor laser at a relatively high level for recording and/or erasing data into and from said optical memory means, a first sample and hold circuit for receiving and holding data corresponding to a beam intensity from said semiconductor laser and being detected when playing back data stored on said optical memory means, first control means for controlling the output of said first current source in response to the output from the first sample and hold circuit in a first type control when recording and/or erasing data in the optical memory means, and in a second type control when playing back data in the optical memory means, a second sample and hold circuit for receiving and holding data corresponding to a beam intensity from said semiconductor laser and being detected when erasing stored on said optical memory means; and second control means for controlling the output current of said second source in response to the output from the second sample and hold circuit in a first type control when recording data in the optical memory means and in a second type control when erasing data in the optical memory means.

2. A beam controller according to claim 1, wherein said first sample and hold circuit is comprised of: switching means having first and second input terminals and an output terminal, low pass filter means connected to the output terminal of said switching means, and memory means for storing an output signal from the low-pass filter means, wherein said first input terminal of the switching means is coupled to and receives input data corresponding to the beam intensity from said semiconductor laser, wherein said second input terminal of the switching means is coupled to and receives output data from the memory means, and wherein said switching means is controlled to connect said first input terminal to the low-pass filter when the play-back mode is selected and to connect said said second input terminal to the low-pass filter when said recording and/or erasing mode is selected.

3. A beam controller according to claim 1 or 2 wherein said second sample and hold circuit is comprised of: switching means having first and second input terminals and an output terminal, low pass filter means connected to the output terminal of said switching means and memory means for storing an output signal from the low-pass filter means wherein said first input terminal of the switching means is coupled to and receives input data corresponding to the beam intensity from said semiconductor laser, wherein said second input terminal of the switching means is coupled to and receives output data from the memory means, and wherein said switching means is controlled to connect said first input terminal to the low-pass filter when the erasing mode is selected and to connect said second input terminal to the low-pass filter when the recording mode is selected.

4. A beam controller for controlling a semiconductor laser included in an optical recording and play-back apparatus including optical memory means and which comprises:

a first current source for driving said semiconductor laser at a relatively low level, a second current source for driving said semiconductor laser at a relatively high level, a first sample and hold circuit for receiving and holding data corresponding to a beam intensity from said semiconductor laser and being detected when playing back data stored on said optical memory means, first control means for controlling the output of said first current source in response to the output from the first sample and hold circuit to provide fixed data value signals for said first current source when recording and/or erasing data in the optical memory means and to provide auto-power control data value signals for said first current source for playing back data from said optical memory means, a second sample and hold circuit for receiving and holding data corresponding to a beam intensity from said semiconductor laser and being detected when erasing data stored on said optical memory means, and second control means for controlling the output current of second current source in response to the output from the second sample and hold circuit to provide fixed data value signals for said second current source when recording data in the optical memory means and to provide auto-power control data value signals for said second current source when erasing data from said optical memory means.

* * * * *